(12) United States Patent
Li et al.

(10) Patent No.: US 11,859,599 B1
(45) Date of Patent: Jan. 2, 2024

(54) VACUUM ARC THRUSTER WITH MULTI-LAYER INSULATION

(71) Applicant: NATIONAL CHENG KUNG UNIVERSITY, Tainan (TW)

(72) Inventors: Yueh-Heng Li, Tainan (TW); Hsun-Chen Hsieh, Chiayi (TW); Ping-Han Huang, Tainan (TW); Wei-Cheng Lo, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 18/342,496

(22) Filed: Jun. 27, 2023

(51) Int. Cl.
*F03H 1/00* (2006.01)
*B64G 1/40* (2006.01)

(52) U.S. Cl.
CPC ........... *F03H 1/0087* (2013.01); *B64G 1/415* (2023.08)

(58) Field of Classification Search
CPC .............................. F03H 1/0087; B64G 1/415
See application file for complete search history.

(56) References Cited

U.S. PATENT DOCUMENTS

| | | | | |
|---|---|---|---|---|
| 8,875,485 B2 * | 11/2014 | Keidar | ................... | F03H 1/0087 60/202 |
| 10,107,271 B2 * | 10/2018 | Keidar | ................... | B64G 1/415 |
| 11,629,706 B2 * | 4/2023 | Li | ........................ | F03H 1/0087 60/202 |

FOREIGN PATENT DOCUMENTS

| | | |
|---|---|---|
| CN | 109185090 A | 1/2019 |
| CN | 110374829 A | 10/2019 |
| TW | I778706 B | 9/2022 |

OTHER PUBLICATIONS

Valentin Steichen, "Development of a new pulsed plasma thruster triggered by a cathodic vacuum arc unit", Master Thesis, Jul. 2020, pp. 18-22, Department of Aeronautics and Astronautics College of Engineering of National Cheng Kung University, Tainan Taiwan (R.O.C.).

* cited by examiner

*Primary Examiner* — Lorne E Meade

(74) *Attorney, Agent, or Firm* — Rosenberg, Klein & Lee

(57) ABSTRACT

A vacuum arc thruster with multi-layer insulation includes a housing, an anode unit and a cathode unit spaced apart from each other in the housing, and an insulator disposed between the anode unit and the cathode unit. The insulator includes a plurality of fuel layers and a plurality of insulating layers. Each insulating layer is located between every two adjacent fuel layers. Accordingly, a multiple-layer design is formed by arranging the fuel layers and the insulating layers which are made of different materials in an alternating manner, thereby attaining the maximum field emission effect, increasing the stability and efficacy of operating the vacuum arc thruster, and prolonging the service life of the thruster.

8 Claims, 4 Drawing Sheets

VACUUM ARC THRUSTER WITH MULTI-LAYER INSULATION

BACKGROUND OF THE INVENTION

1. Field of the Invention

This invention relates to a thruster structure and relates particularly to a vacuum arc thruster with an insulator having a multi-layer structure.

2. Description of the Related Art

A vacuum arc thruster is mainly applied by adding the voltage between an anode and a cathode, which induces plasma between the two metal electrodes and also ablates a surface of the metal to thereby generate thrust. Referring to FIG. 1, a conventional vacuum arc thruster 1 includes a housing 11, an anode 12 disposed in the housing 11, a cathode 13 disposed in the housing 11 and spaced apart from the anode 12, an insulator 14 located between the anode 12 and the cathode 13, a graphite membrane 15 disposed on a surface of the insulator 14, and a controller 16 adapted to control an electric discharging operation of the anode 12 and the cathode 13. In use, an electric discharge phenomenon occurs between the anode 12 and the cathode 13 under the control of the controller 16. This is executed by adding high voltage to an area between the anode 12 and the cathode 13 to generate a field emission effect whereby electrons are generated on the surface of the metal to thereby induce plasma. In terms of an excessively long distance between the two electrodes, the extremely high voltage is required to actuate the above reactions, so a graphite membrane 15 is mainly put on a surface of the insulator 14 for the thruster 1 to increase the discharging effect. In case of lack of the graphite membrane 15, the thruster 1 may need about dozens of kilovolts to discharge in a vacuum state. The graphite membrane 15 possessing conductivity is adopted to decrease the voltage of operating the thruster 1, which allows the plasma to be generated by lower voltage and then generates thrust whereby an operation of the thruster 1 is actuated.

However, the thrust may be changed because of variations in the plasma at the beginning of the operation, so the thruster 1 may lack stability easily. In addition, the long-term use of the thruster 1 may lead to the repeated deposition of the graphite membrane 15 easily, which, however, may incur a great decrease in the ablation effect of the fuel and a corresponding reduction in the efficiency of utilizing energy. Furthermore, although the vacuum arc thruster 1 uses the graphite membrane 15 for ease of discharging, a too thin graphite membrane 15 or the graphite membrane 15 in a small quantity may still be ablated and completely exhausted because of an increase in the number of discharges, which renders the thruster 1 unable to operate. Therefore, the service life of the vacuum arc thruster 1 is easily subject to the number of discharges and becomes shortened, with the result that the efficiency of utilizing energy is reduced. Furthermore, a too thick graphite membrane 15 may fail to generate the plasma, which may be difficult to generate the thrust. Therefore, it is a goal how to provide a vacuum arc thruster with a longer service life, increased efficiency of energy utilization, and good stability.

SUMMARY OF THE INVENTION

An object of this invention is to provide a vacuum arc thruster with multi-layer insulation capable of utilizing energy more accurately and prolonging the service life efficiently.

According to this invention, a vacuum arc thruster with multi-layer insulation includes a housing in which an anode unit, a cathode unit, and an insulator can be respectively disposed. A housing defines a central axis and includes an inner peripheral wall and an electric discharging room enclosed by the inner peripheral wall. The anode unit and the cathode unit are disposed in the electric discharging unit and spaced apart from each other. The insulator is located between the anode unit and the cathode unit. The insulator includes a plurality of fuel layers, and between every two adjacent fuel layers is disposed an insulating layer whose material is different from a material of the fuel layers.

In accordance with the above arrangement, the insulator is formed into a multi-layer structure by arranging the fuel layers and the insulating layers in an alternating manner, which allows the fuel layers and the insulating layers to attain the maximum discharging efficacy whereby a field emission effect can be strengthened. Accordingly, electrons caused by the field emission effect can be efficiently utilized, the stability and efficacy of the operation of the vacuum arc thruster can be increased, and the prolongation of the service life thereof can be attained.

Preferably, one end of the fuel layer forms a first surface, and one end of the insulating layer forms a second surface. In one preferred embodiment, the first surface and the second surface can be perpendicular to the central axis. In another preferred embodiment, the first surface and the second surface can be inclined to the central axis.

Preferably, the material of the fuel layers can be graphite, which means that the fuel layers are made of graphite. The material of the insulating layers can be Teflon, which means that the insulating layer disposed between every two adjacent fuel layers can be made of Polytetrafluoroethylene (PTFE), and the commonly known brand name of PTFE-based composition is Teflon.

Preferably, a control device can be connected to the anode unit and the cathode unit and adapted to control an electric discharging operation of the anode unit and the cathode unit, which generates electric arcs for forming plasma whereby thrust can be generated.

Preferably, in one preferred embodiment, the cathode unit can be in contact with the inner peripheral wall of the housing, and the anode unit can be located in a center of the housing along the central axis so that the cathode unit, the insulator, and the anode unit are sequentially arranged from the inner peripheral wall to the central axis within the electric discharging room.

DETAILED DESCRIPTION OF THE PREFERRED EMBODIMENTS

Figure 2:
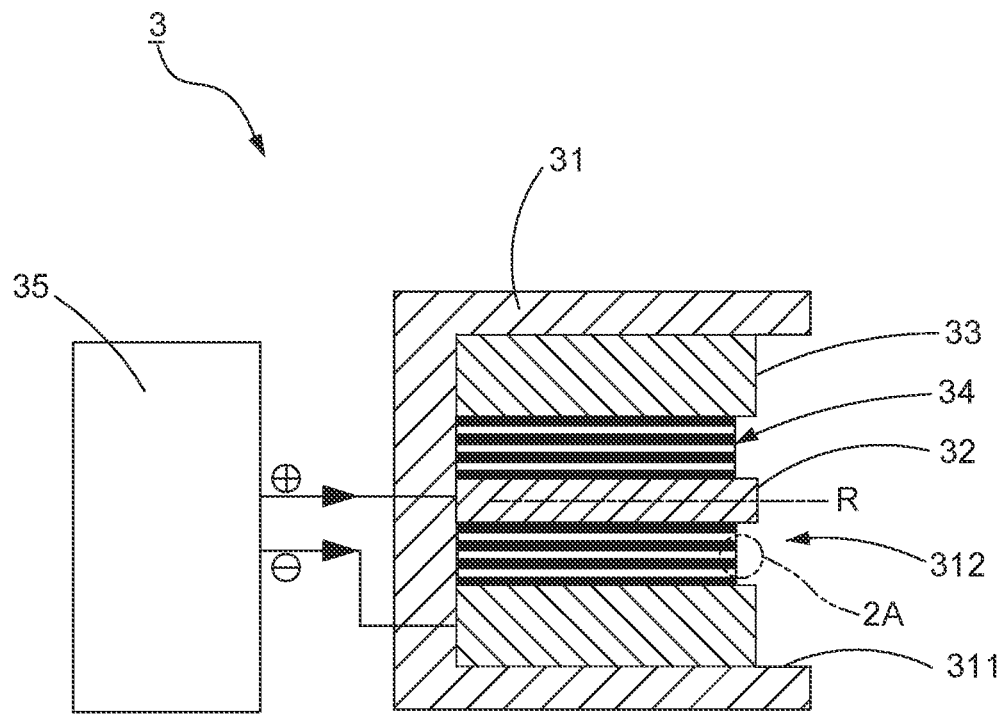
FIG. 2 is a schematic view showing a first preferred embodiment of this invention.

Referring to FIG. 2, a first preferred embodiment of a vacuum arc thruster with multi-layer insulation is shown.

The vacuum arc thruster 3 is adapted to be operated in a vacuum environment. The vacuum arc thruster 3 includes a housing 31, an anode unit 32, a cathode unit 33, and an insulator 34. A central axis R is defined by the housing 31. The housing 31 includes an inner peripheral wall 311 and an electric discharging room 312 enclosed by the inner peripheral wall 311. The anode unit 32, the cathode unit 33, and the insulator 34 are disposed in the electric discharging room 312. The insulator 34 is located between the anode unit 32 and the cathode unit 33 so that the cathode unit 33 is spaced apart from the anode unit 32. In an example as shown in the preferred embodiments of this invention, the anode unit 32 can be located in a center of the housing 31 along the central axis R, and the cathode unit 33 can touch the inner peripheral wall 311 so that the cathode unit 33 is in close contact with the housing 31. Therefore, it is shown in the figure that the cathode unit 33, the insulator 34, and the anode unit 32 are sequentially arranged from the inner peripheral wall 311 to the central axis R. Specifically, in the electric discharging room 312, the inner peripheral wall 311 surrounds the cathode unit 33, the cathode unit 33 surrounds the insulator 34, and the insulator 34 surrounds the anode unit 32. In the example as shown in the preferred embodiments of this invention, the cathode unit 33, the insulator 34 (including fuel layers 341 and insulating layers 342 which are hereinafter described), and the anode unit 32 can be in concentric relationship with one another around the central axis R.

Figure 2A:
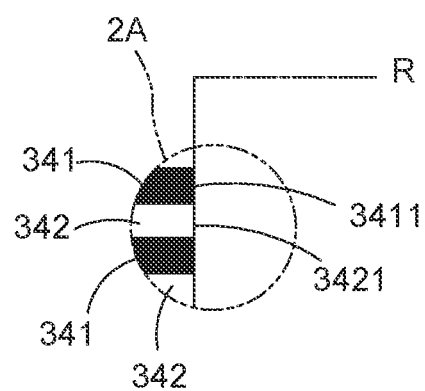
FIG. 2A is an enlarged view showing an encircled portion 2A of FIG. 2.

The insulator 34, as shown in FIG. 2A, includes a plurality of fuel layers 341 and a plurality of insulating layer 342, and herein the term "a plurality of" denotes two or more than two. Each insulating layer 342 is disposed between every two adjacent fuel layers 341 so that the fuel layers 341 and the insulating layers 342 are arranged in an alternating manner to form a multiple-layer (multi-layer) design. The number of fuel layers 341 and the number of insulating layers 342 can be adjusted according to demand. As shown in FIG. 2, when the insulator 34 is encircled by the cathode unit 33, and the anode unit 32 is encircled by the insulator 34, it is noted that the cathode unit 33 can surround the outermost fuel layer 341 furthest from the central axis R, and the innermost fuel layer 341 closest to the central axis R can surround the anode unit 32.

In addition, the material of the fuel layer 341 is different from the material of the insulating layer 342. For instance, the fuel layer 341 can be made of graphite or other suitable materials. The insulating layer 342 can be made of TEFLON or other suitable materials. The term "TEFLON" is a registered trademark used for Polytetrafluoroethylene (PTFE), sold under the trademark TEFLON™. In this preferred embodiment, the graphite and TEFLON are adopted as an example. It is also noted that an end of the insulator 34 can be perpendicular to the central axis R. Specifically, one end of each fuel layer 341 forms a first surface 3411, and one end of each insulating layer 342 forms a second surface 3421. The first surface 3411 and the second surface 3421 are perpendicular to the central axis R. Therefore, the first surface 3411 and the second surface 3421 can be plane.

The thruster can also include a control device 35. The control device 35 is connected to the anode unit 32 and the cathode unit 33 respectively and adapted to control an electric discharging operation of the anode unit 32 and the cathode unit 33, thereby generating electric arcs by which plasma is generated to facilitate the generation of thrust. The control device 35 is included in the preferred embodiments of this invention.

Figure 3:
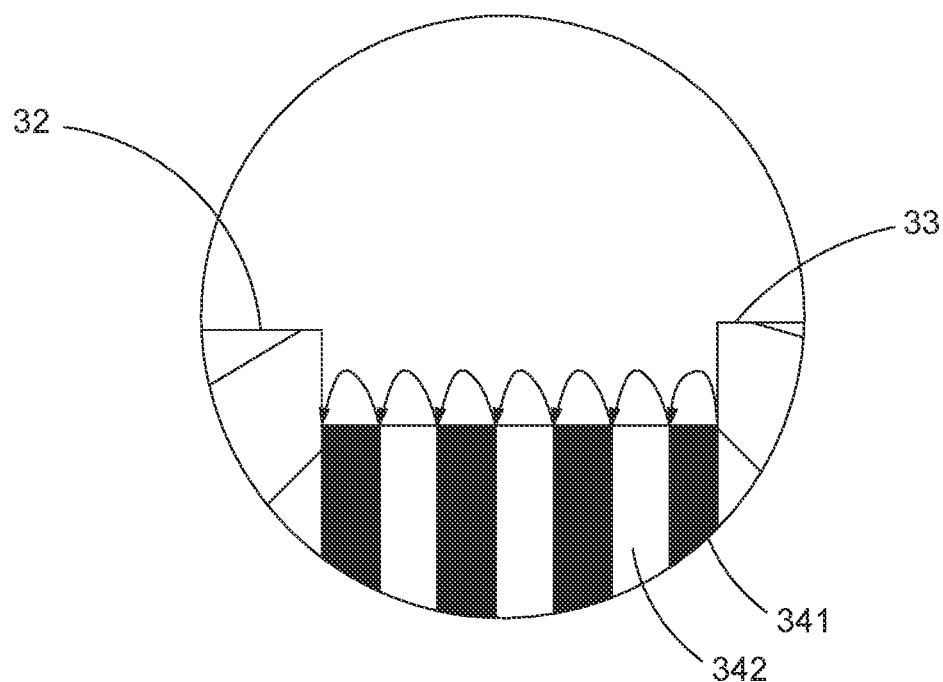
FIG. 3 and FIG. 4 are schematic views showing the operation of the first preferred embodiment of this invention.
Figure 4:
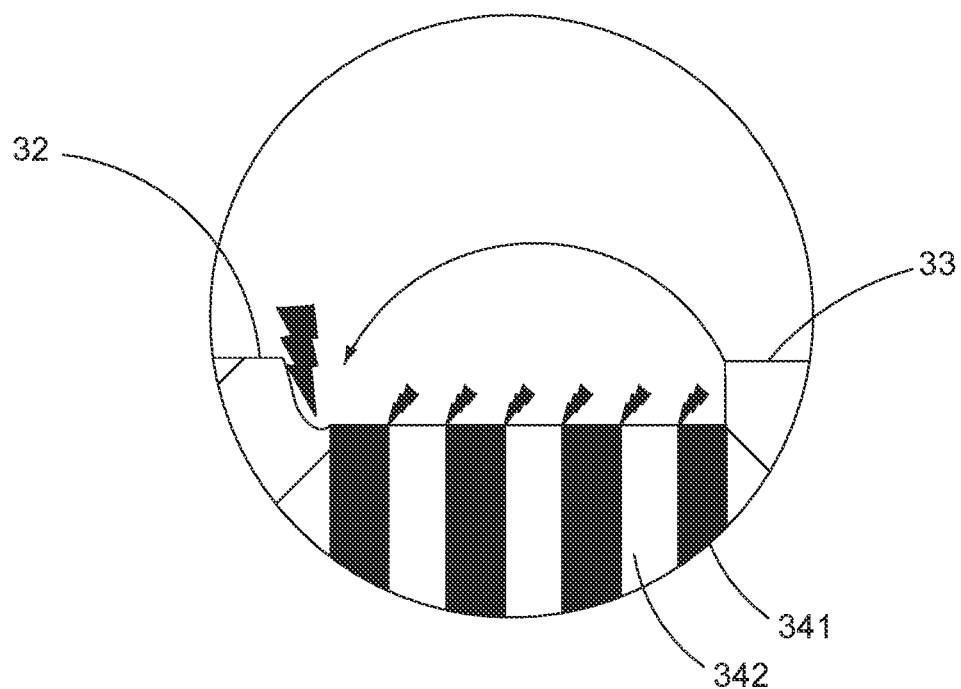

The operation of this invention is described with the aid of FIG. 2. The anode unit 32 and the cathode unit 33 are activated under the control of the control device 35 to induce an electric discharge reaction. Because the electrodes, namely the anode unit 32 and the cathode unit 33, the fuel layers 341, and the insulating layers 342 can be made of different materials, a distortion of an electric field takes place at junctions between these different materials in a vacuum environment, and the distorted electric field implies an easy generation of electric arcs to achieve a more significant field emission effect. In the example as shown in FIG. 3, the electric arc generated at one electrode, such as the cathode unit 33 which can be made of metal, passes a strong electric field gradient area providing multi-interfaces between the fuel layers 341 and the insulating layers 342 and then moves to the other electrode, such as the anode unit 32 which can be made of metal. At this moment, the electric arc, as shown in FIG. 4, bombards the surface of the metal electrode to generate plasma and ablates the metal fuel, thereby generating thrust by which the vacuum arc thruster 3 is actuated and operated in the vacuum environment.

Figure 1:
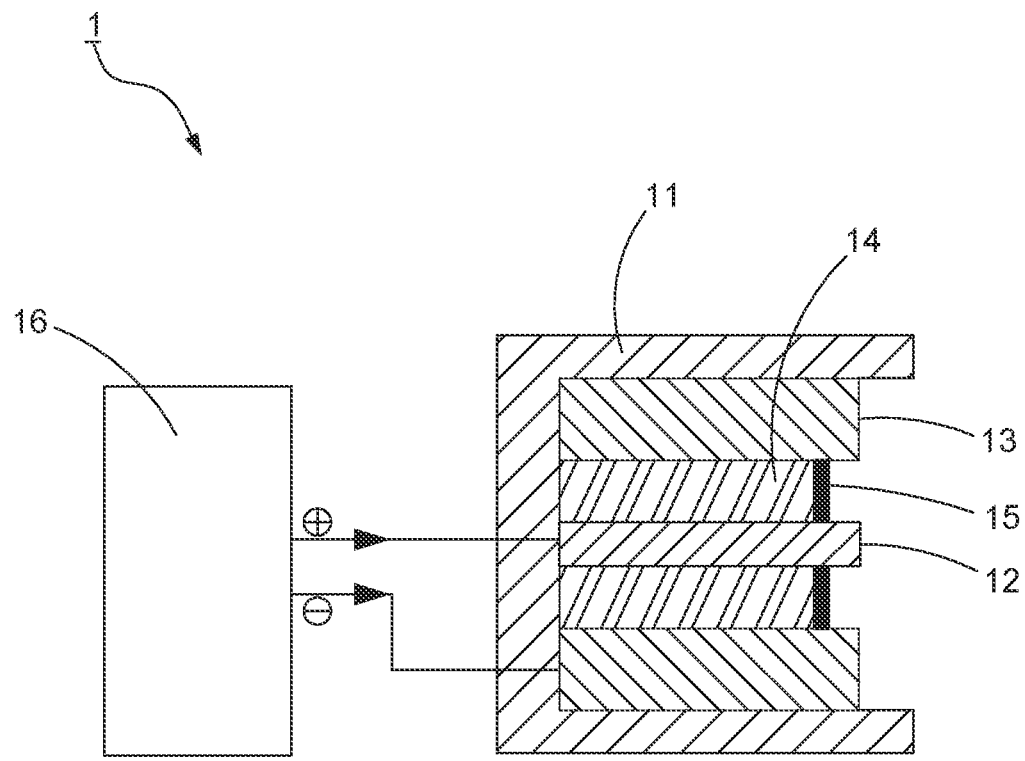
FIG. 1 is a schematic view showing a conventional vacuum arc thruster.

Accordingly, the insulator 4 is formed into a multi-layer structure because of the insulating layers 342 and the fuel layers 341 made of different materials and arranged in an alternating manner. The insulator 4 and the two electrodes, namely the cathode unit 33 and the anode unit 32, also differ in material. In this regards, the distortion of the electric field occurs at the interfaces, i.e. junctions, between different materials while exerting high voltage on the insulator 34, which allows the electric arc to punch through easily and ablate the conductive substance generated on the surface of the fuel layers 341, thereby changing the dielectric constant within the electric discharging room 312. This phenomenon allows the plasma to be easily generated within the electric discharging room 312 for further generation of the thrust, which can increase the stability of the initial operation of the thruster 3. Unlike the conventional structure shown in FIG. 1, the multi-layer structure of the insulator 34 neither puts the graphite membrane 15 on the surface of the insulator 14 for discharging nor causes the thin graphite membrane 15 to be easily run out because of an increase in the number of discharges. Therefore, the electric field between the anode unit 32 and the cathode unit 33 is fully triggered to fulfill the maximum efficacy with the aid of the fuel layers 341 and the insulating layers 342, which allows the electric discharging operation to be more stable, attains a longer discharging life, and prolongs the service life of the vacuum arc thruster 3 in an efficient manner.

Figure 5:
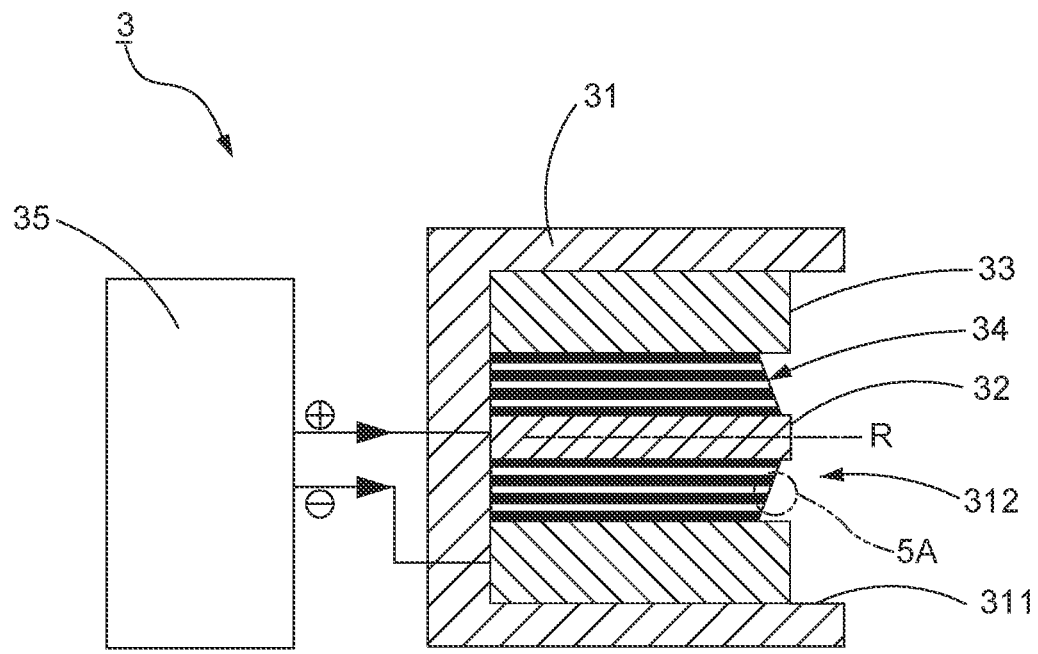
FIG. 5 is a schematic view showing a second preferred embodiment of this invention.
Figure 5A:
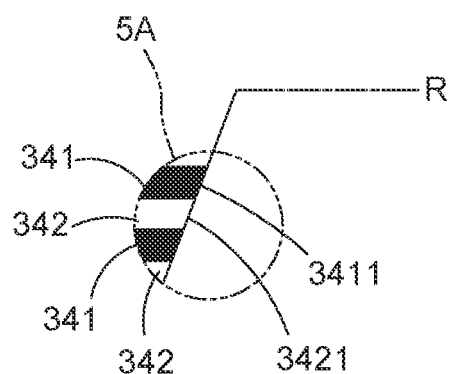
FIG. 5A is an enlarged view showing an encircled portion 5A of FIG. 5.

Referring to FIG. 5 and FIG. 5A, a second preferred embodiment of a vacuum arc thruster with multi-layer insulation is shown. The vacuum arc thruster 3 still includes the housing 31, the anode unit 32, the cathode unit 33, the insulator 34, and the control device 35. The concatenation of correlated elements, operations, and effects of the second preferred embodiment are the same as those of the first preferred embodiment and herein are omitted. In particular, the second preferred embodiment differs from the first preferred embodiment in having the end of the insulator 34 which is inclined to the central axis R. Specifically, each first surface 3411 of each fuel layer 341 and each second surface 3421 of each insulating layer 342 can be inclined to the central axis R, so the first surface 3411 and the second surface 3421 are formed into a slanted surface. Accordingly, when the anode unit 32 and the cathode unit 33 are activated under the control of the control device 35 to induce an electric discharge reaction, the slope of the slanted surface helps strengthen the field emission effect with generation of electrons for achieving an efficient utilization of the electrons, increases the operating stability and efficacy of the vacuum arc thruster 1, and extends the duration thereof, i.e. prolongs the service life.

To sum up, this invention takes advantage of the insulator formed into a multi-layer structure, i.e. a structure with multiple layers, by alternating fuel layers with insulating layers. This allows the physical phenomenon of "triple junction" to take place at the interfaces between the fuel layers, the insulating layers, and a vacuum environment. Accordingly, the maximum efficacy can be fulfilled within the electric field between the anode unit and the cathode unit by means of the insulator, the stability and efficacy of the operation of the thruster can be efficiently enhanced, and the service life of the thruster can be prolonged.

While the embodiments are shown and described above, it is understood that further variations and modifications may be made without departing from the scope of this invention.

What is claimed is:

1. A vacuum arc thruster with multi-layer insulation comprising:
    a housing defining a central axis and including an inner peripheral wall and an electric discharging room enclosed by said inner peripheral wall;
    an anode unit disposed in said electric discharging room;
    a cathode unit disposed in said electric discharging room and spaced apart from said anode unit; and
    an insulator disposed in said electric discharging room and located between said anode unit and said cathode unit, wherein said insulator includes a plurality of fuel layers disposed in said electric discharging room and an insulating layer disposed between every two adjacent fuel layers, said plurality of fuel layers being made of a material different from a material of each said insulating layer disposed between every two adjacent fuel layers.

2. The vacuum arc thruster according to claim 1, wherein one end of each said fuel layer forms a first surface, one end of each said insulating layer forming a second surface, said first surface and said second surface being perpendicular to said central axis.

3. The vacuum arc thruster according to claim 1, wherein one end of each said fuel layer forms a first surface, one end of each said insulating layer forming a second surface, said first surface and said second surface being inclined to said central axis.

4. The vacuum arc thruster according to claim 1, wherein said plurality of fuel layers are made of graphite.

5. The vacuum arc thruster according to claim 1, wherein each said insulating layer disposed between every two adjacent fuel layers is made of Polytetrafluoroethylene (sold under the trademark TEFLON™).

6. The vacuum arc thruster according to claim 4, wherein each said insulating layer disposed between every two adjacent fuel layers is made of Polytetrafluoroethylene (sold under the trademark TEFLON™).

7. The vacuum arc thruster according to claim 1, further comprising a control device connected to said anode unit and said cathode unit for controlling an electric discharging operation of said anode unit and said cathode unit.

8. The vacuum arc thruster according to claim 1, wherein said cathode unit is in contact with said inner peripheral wall of said housing, and said anode unit is located in a center of said housing along said central axis so that said cathode unit, said insulator, and said anode unit are sequentially arranged from said inner peripheral wall to said central axis within said electric discharging room.

\* \* \* \* \*